L. SIRIEIX.

Assignor to the SIRIEIX MARINERS COMPASS COMPANY.

SHIP'S COMPASS.

No. 10,991. Reissued Mar. 26, 1889.

WITNESSES

A. L. Buhrman.

F. T. F. Johnson

INVENTOR

Leon Sirieix

By M. Kalb

Attorney

N. PETERS, Photo-Lithographer, Washington, D. C.

UNITED STATES PATENT OFFICE.

LÉON SIRIEIX, OF SAN FRANCISCO, CALIFORNIA, ASSIGNOR TO THE SIRIEIX MARINERS COMPASS COMPANY.

SHIP'S COMPASS.

SPECIFICATION forming part of Reissued Letters Patent No. 10,991, dated March 26, 1889.

Original No. 378,528, dated February 28, 1888. Application for reissue filed February 26, 1889. Serial No. 301,296.

*To all whom it may concern:*

Be it known that I, LÉON SIRIEIX, of the city and county of San Francisco, State of California, assignor to the Sirieix Mariners Compass Company, of San Francisco, have discovered and invented an Improved Apparatus for Correcting the Deviations of the Magnetic Needle or Compass; and I do hereby declare that the following is a true and correct description thereof.

My invention has for its object the provision of a simple and effective arrangement for correcting the deviations of the magnetic needle, whether such deviations arise from general or local influences.

It is well known that any local attraction—such as the proximity of iron or loadstone—will greatly disturb the normal position of the needle and produce more or less deviation, according to the condition under which the needle is placed. This is especially noticeable on iron or steel vessels or ships, or when such magnetic bodies are carried by wooden vessels. In such cases the deviation of the magnetic needle is often so great and uncertain as to render it almost useless as a guide to navigation. I have discovered that the deviation can be corrected by means of a correcting-compass provided with certain magnetic bars, the principal ones of which are set and held so that their polarity is inverse to the deviating influences, and also by means of upright soft-iron blocks so arranged that their adjustment can be placed in the line of the disturbing influence, and that the magnetic current passing through these bars and blocks will correct the prime needle or compass, and that the power of this correcting influence can be regulated by the vertical adjustment and the horizontal motions of the soft-iron correctors, so as to produce a differential or differentiated action upon the needle of the prime compass, and that the quadrantal errors caused by induction of the soft iron will be compensated for all practical purposes.

In this specification I use the term "differential" to designate the position which the needle assumes when caught between the two forces—the one derived from the sub-permanent and induced magnetism of the vessel, the other from the compensating action of the correcting-compass—thus leaving the needle under the sole control of the terrestrial magnetism.

The accompanying drawings illustrate a practical means for carrying the invention into practice and use.

Figure 1:
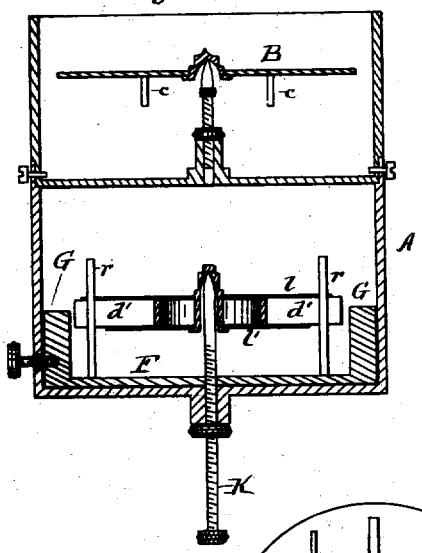
Figure 2:
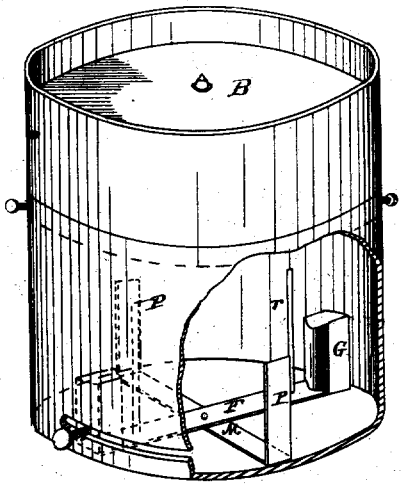
Figure 3:
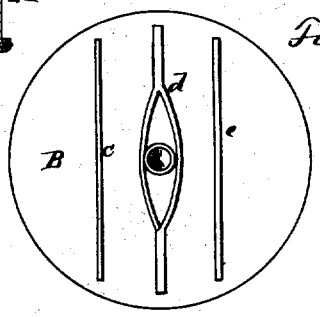
Figure 4:
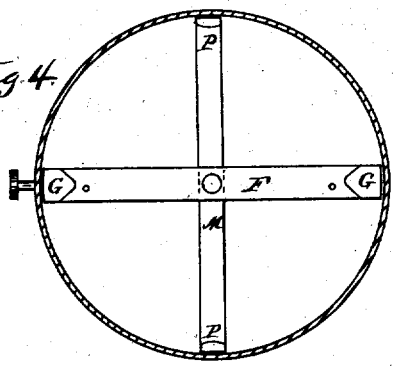
Figure 5:
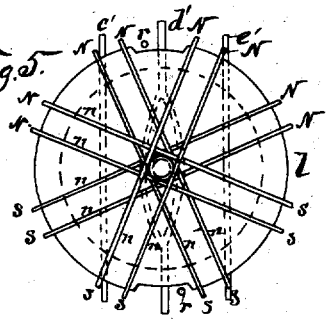
Figure 6:
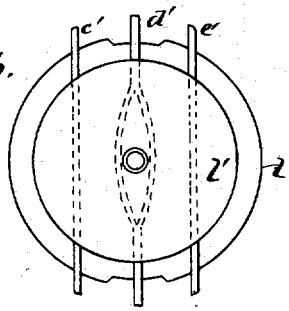

Figure 1 is a vertical section of the compass-box, showing the true or prime compass and the correcting-compass in position. Fig. 2 is a perspective view of the compass-box with a piece broken away to show the soft-iron blocks or inductors, and the guides keeping the correcting-compass in position and their means for adjustment. Fig. 3 is a bottom view of the prime-compass card. Fig. 4 is a plan view of the bottom of the compass-box, showing the relative position of the two bars of non-magnetic substance on which the correcting-compass and soft-iron blocks are held in place. Fig. 5 is a plan view of the upper card of the correcting-compass, and Fig. 6 is a bottom view of the same.

Let A represent the case, binnacle, or box, in which a compass or magnetic needle, B, is mounted in the usual and ordinary way. For the purpose of brevity the compass B will be termed the "prime" compass throughout the specification.

I may divide the case, binnacle, or box A by a horizontal partition into an upper and lower compartment, or I may telescope one part over the other; or, if preferred, I may use only a single compartment and place the whole mechanism inside.

When the case, binnacle, or box is mounted in two compartments, the prime compass is placed in the upper and the correcting-compass and parts used with it in the lower compartment. On the under side of my prime-compass card B, I use three light magnetic needles parallel to each other, the side ones being thirty degrees distant from the center one, *d*, which coincides exactly with the line N & S on the face of the card. Though I do not hold myself to any number of needles on the card B, I have obtained better results with three needles thus arranged, therefore preferring that disposition as described.

Upon the pointed and smooth end of a threaded rod or spindle, K, which extends into the box A and can be adjusted from the outside thereof, the correcting-compass is mounted beneath the prime compass. The correcting-compass consists of two disks of cardboard, mica, or other non-magnetic substance, the upper one, *l*, being somewhat larger in diameter than the lower disk, *l'*. These disks are fixed on the central hub or center pivot-block at a short distance apart, as shown in Fig. 1, and are separated either by washers or by the needles *c' d' e'*, which may be fastened on the lower disk, if preferable, the needles *c' d' e'* being mounted thirty degrees apart in relation to the bars of the prime compass, and for the same reason, and in the line corresponding to N & S of the upper disk *l*, on the face of which are mounted four pairs of small magnetic needles or bars, *n n*, placed diagonally across each other and across the disk *l*, so that each pair of bars from the center to the periphery of the disk will point to one of the cardinal points of the compass, the four pairs of cross bars or strips forming eight radial pairs, leading from the center outward. The poles of these small bars *n n* are arranged to balance each other half north and half south, as indicated in Fig. 5 by N S.

Upon the bottom of the lower compartment of the binnacle or box I secure a brass or other non-magnetic bar, F, which moves round the stud through which the screw-rod K enters the box. To each end of the bar F, I secure an upright block of soft iron, G. A horizontal slot is made in the side of the case A opposite one of the blocks, through which a threaded pin from the block passes, and a thumb or set nut, *i*, serves to fasten the blocks and connecting-bar in place against the outside of the box A, and to place the soft-iron blocks in the required position by moving them the length of the slot to the right or left of the center line fore and aft. The block's shape is preferably beveled to a blunt edge, which is adjusted facing the center needle, *d*. The correcting-compass *l l* is held in place by means of brass guides *r r*, which can be made of any non-magnetic substance, and they are so constructed as to only allow the necessary play to raise or lower the correcting-compass by means of the screw K.

Upon the bottom of the binnacle or box A, I secure another brass or non-magnetic bar, M, on each end of which I fasten a block of soft iron, P. Said blocks are placed on the line of the influence caused by the induced magnetism of the soft iron of the ship, which is left uncompensated by the action of the corrector *l l'* and the soft-iron blocks G.

The combined action of the small magnets of the corrector *l l'*, transmitting through the soft-iron blocks G an influence of the same nature, of the same intensity, but of inversed polarity, has for its effects to neutralize the disturbance caused by the sub-permanent and induced magnetism which the iron of the vessel has obtained during and by its position while in course of her construction, correcting therefor all deviations due to those otherwise unchecked influences, such as the semicircular and the heeling error; and the quadrantal is corrected by means of the side soft irons, P, which, by being moved more or less from their side position around the compass-box, offset the influence left uncompensated due to the effect of the induced magnetism of the soft iron of the vessel.

Having thus described my invention, what I claim, and desire to secure by Letters Patent, is—

1. A correcting-compass, *l l'*, provided with two sets of magnetic bars, one set being underneath the card of the compass and the other set on its top, in combination with a prime compass having magnetic bars, substantially as set forth.

2. In a compensating compass, the combination, with a prime compass and a correcting-compass, of the soft-iron blocks G, mounted and moved with the correcting-compass, as set forth.

3. In a compensating compass, the combination, with a prime compass and a correcting-compass, of the soft-iron blocks G, mounted and moved with the correcting-compass, and means, substantially as described, for adjusting the said blocks and correcting-compass in a horizontal plane, as set forth.

4. In a compensating compass, the combination, with the prime compass and a correcting-compass, of the soft-iron blocks G G and bar F, on the ends of which they are mounted, and the guides or stops *r r* on bar F, to hold the correcting-compass, as set forth.

5. In a compensating compass, the combination of a prime compass and a correcting-compass and the soft irons P, arranged and held in place on bar M, to compensate the influence due to the induced magnetism in the vertical and horizontal soft iron of the ship, substantially as described.

In witness whereof I have hereunto set my hand this 9th day of February, 1889.

LÉON SIRIEIX.

In presence of—
THOS. H. SAWYER,
J. M. BRANCH.